United States Patent [19]
Hoff et al.

[11] Patent Number: 4,490,514
[45] Date of Patent: Dec. 25, 1984

[54] HIGH-TEMPERATURE ETHYLENE POLYMERIZATION AND COPOLYMERIZATION USING DIALUMINOXANE COCATALYSTS

[75] Inventors: Raymond E. Hoff, Palatine; Thomas Pullukat, Hoffman Estates, both of Ill.

[73] Assignee: Chemplex Company, Rolling Meadows, Ill.

[21] Appl. No.: 524,012

[22] Filed: Aug. 16, 1983

[51] Int. Cl.$^3$ ............................................. C08F 10/02
[52] U.S. Cl. .................................. 526/165; 526/151; 526/127
[58] Field of Search ........................ 526/165, 151, 127

[56] References Cited

U.S. PATENT DOCUMENTS

| | | | |
|---|---|---|---|
| 2,882,264 | 4/1959 | Barnes et al. | 260/949 |
| 4,105,842 | 8/1978 | Nicoo et al. | 526/65 |
| 4,210,734 | 7/1980 | Machon | 526/65 |
| 4,263,170 | 4/1981 | Bujadoux | 252/429 C |
| 4,263,171 | 4/1981 | Shida et al. | 252/429 C |
| 4,268,418 | 5/1981 | Hoff | 252/429 B |
| 4,298,717 | 11/1981 | Machon | 526/124 |
| 4,359,403 | 11/1982 | Hoff et al. | 252/429 B |
| 4,374,753 | 2/1983 | Pullukat et al. | 252/429 B |

FOREIGN PATENT DOCUMENTS

| | | | |
|---|---|---|---|
| 1277497 | 6/1972 | United Kingdom . | |
| 2057468 | 7/1981 | United Kingdom . | |
| 2099834 | 12/1982 | United Kingdom . | |
| 2068007 | 6/1983 | United Kingdom . | |
| 388008 | 11/1973 | U.S.S.R. | 526/165 |

*Primary Examiner*—Paul R. Michl
*Assistant Examiner*—Alex H. Walker
*Attorney, Agent, or Firm*—Wood, Dalton, Phillips, Mason & Rowe

[57] ABSTRACT

A method for polymerization of ethylene and copolymerization of ethylene with other 1-olefins at high temperatures in the presence of a transition metal catalyst and a tetra alkyl-$\mu$-oxodialuminum compound.

12 Claims, No Drawings

HIGH-TEMPERATURE ETHYLENE POLYMERIZATION AND COPOLYMERIZATION USING DIALUMINOXANE COCATALYSTS

BACKGROUND OF THE INVENTION

1. Field of the Invention

This invention relates generally to olefin polymerization and, more particularly, this invention relates to a method of polymerizing and copolymerizing ethylene at high temperatures.

2. Brief Description of the Prior Art

In recent years, transition metal-based catalyst systems have been developed which allow the production of high density polyethylene (HDPE) and so-called linear low density polyethylene (LLDPE) under high pressure, high temperature conditions which had previously been used for the production of low density polyethylene (LDPE). An important economic advantage which has resulted from these catalyst systems is the capability of using a single reaction vessel for the production of different polyethylene products.

However, prior transition metal-based ethylene polymerization and copolymerization systems, when operated at high temperatures, (i.e., above about 160° C.) exhibit several disadvantages. Even though catalyst reactivity (based on transition metal content) tends to increase with a rise in temperature, catalyst life time tends to decrease with an increase in temperature. Operation at high temperatures generally results in low yields due to thermal instability of the catalyst, and product polymer melt index is generally relatively high, and thus the molecular weight low. Such resins are not generally strong. This problem is especially acute in the copolymerization of ethylene with 1-olefins.

Further, many prior high temperature catalyst systems utilize alkyl aluminum chloride or similar halogen-containing cocatalysts, thus resulting in a high halogen content in the catalyst system which in turn contributes to high halide contents (in the form of catalyst residues) in polymer products. Such halide-containing residues are highly corrosive.

One method of high temperature (e.g., 175°–300° C.) ethylene polymerization is described in U.S. Pat. No. 2,882,264 (Apr. 14, 1959) to Barnes et al. In the Barnes et al patent, a simple Ziegler catalyst is used at a pressure greater than about 500 atmospheres. The catalyst is broadly described as the reaction product of a transition metal compound of Group IVB, VB or VIB of the Periodic Table and an organometallic cocatalyst. A typical cocatalyst is triisobutylaluminum (TIBAL). The best reactivity of the Barnes et al system corresponds to 2120 g/gTi/minute, which is very low.

U.S. Pat. No. 4,210,734 (July 1, 1980) to Machon discloses several magnesium-titanium combinations as being useful in high temperature, high pressure ethylene polymerization. Hydrides and organometallic compounds of metals of Groups I–III of the Periodic Table are disclosed as activators or cocatalysts. Typical of the cocatalysts are tri-n-octylaluminum and dimethylethylsiloxalanes.

U.S. Pat. Nos. 4,105,842 (Aug. 8, 1978) to Nicco et al, 4,298,717 (Nov. 3, 1981) to Machon, and 4,263,170 (Apr. 21, 1981) to Bujadoux disclose the use of trialkylaluminum, halogenated dialkylaluminum, and alkylsiloxalanes as useful cocatalysts in high temperature ethylene polymerization.

British patent application No. 2,057,468A (published July 24, 1981) of Mitsubishi Petrochemical Company describes the use of siloxalanes as useful cocatalysts in high temperature ethylene polymerization and copolymerization.

As far as the inventors are aware, the only prior cocatalysts used in combination with transition metal catalysts in high temperature polymerization of ethylene are aluminum compounds with the formulas $R_3Al$, $R_2AlCl$, and $R'_3SiOAlR_2$, where R and R' are alkyl groups.

SUMMARY OF THE INVENTION

It is an object of the invention to overcome one or more of the problems described above.

According to the present invention, ethylene is polymerized or copolymerized with one or more 1-olefins under polymerizing conditions at a temperature of at least about 160° C. in the presence of a catalyst system which comprises a transition metal polymerization catalyst and a cocatalyst which comprises a tetraalkyl-$\mu$-oxodialuminum compound.

More specifically, the cocatalyst comprises a compound of the general formula:

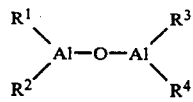

where $R^1$–$R^4$ are the same or different alkyl groups having between about 1 and 12 carbon atoms.

According to the invention, the thermal stability of the transition metal catalyst is improved so that relatively high yields are obtained at high temperatures. Further, the melt index of polymer products manufactured according to the invention are relatively low, and molecular weights are relatively high. Such resins are desirably strong.

As a result of the relatively low polymer melt index, the present invention is advantageous for the production of ethylene/1-alkene copolymers of the type generally known as linear low density polyethylene. Thus, LLDPE resins can be manufactured in conventional low density polyethylene reaction vessels and plants.

Also, the halogen content of the catalyst system is decreased by the reduction or elimination of metallic halides in the system.

These and other objects will be readily apparent from the following detailed description taken in conjunction with the appended claims.

DETAILED DESCRIPTION OF THE INVENTION

The Catalyst System

According to the present invention, ethylene is polymerized, or copolymerized with other 1-olefins, under polymerizing conditions at temperatures of at least about 160° C. in the presence of a catalyst system which comprises a transition metal catalyst and a cocatalyst. The cocatalyst is a tetraalkyl-$\mu$-oxodialuminum compound of the general formula

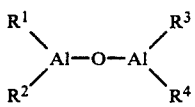

wherein each group $R^1$–$R^4$ is the same or different alkyl group of about 1–12 carbon atoms.

The Transition Metal Catalyst

The use of transition metal catalysts for ethylene polymerization, and for copolymerization of ethylene and other 1-olefins, is well known. However, such catalysts are generally used for ethylene polymerization or copolymerization at temperatures of less than about 150° C. According to the present invention, such catalysts are useful in ethylene polymerization and copolymerization at temperatures of about 160° C. and above.

Broadly stated, the transition metal catalyst of the invention comprises a catalytically active transition metal compound or complex. (As used herein, the term "compound" includes complexes.) As is well known in the art, these transition metal compounds may be in combination with other compounds, such as compounds or complexes of metals of Groups I–III of the Periodic Table.

Such catalysts include those which are generally known in the art as Ziegler catalysts. The scope of this invention includes all catalysts which are suitable for 1-olefin polymerization and copolymerization, and which incorporate a transition metal compound or complex as an active ingredient.

Catalysts incorporating titanium, vanadium, zirconium and/or chromium are preferred due to their relatively high activities. Transition metal halides and oxyhalides are preferred for their high activities. Suitable transition metals and catalysts made therefrom are disclosed in U.K. patent specification No. 1,277,497 (June 14, 1972) to Showa Denko K.K., the disclosure of which is hereby incorporated herein by reference.

The transition metal catalysts of the invention may be supported or unsupported and, if present, the support can be any suitable material, such as an inorganic oxide or a polyolefin, for example. Further, the support may be treated during the production of the catalyst with a modifying agent, such as an alcohol, a silane, or a halogen, for example.

Examples of suitable transition metal catalysts are described in the following patents and patent applications, all assigned to the assignee hereof:

U.S. Pat. No. 4,263,171 (Apr. 21, 1981) to Shida et al., U.S. Pat. No. 4,268,418 (May 19, 1981) to Hoff, U.S. Pat. No. 4,359,403 (Nov. 16, 1982) to Hoff et al., U.S. Pat. No. 4,374,753 (Feb. 22, 1983) to Pullukat et al., Pullukat et al U.S. application Ser. No. 112,560 filed Jan. 16, 1980, Pullukat et al U.S. application Ser. No. 270,410 filed June 3, 1981, Pullukat et al U.S. application Ser. No. 433,369 filed Oct. 7, 1982, U.K. Pat. No. 2,068,007 (June 22, 1983), and published U.K. application No. 2,099,834 (published Dec. 5, 1982).

The disclosures of each of the above-identified patents and patent applications are hereby incorporated herein by reference.

The foregoing list of disclosures is not to be considered to be limiting in any way, but are identified as examples of disclosures of catalysts in which a transition metal compound is in combination with a magnesium compound which is either a dialkyl magnesium compound or complex or an organomagnesium silylamide compound.

Preferred transition metal catalysts for use in this invention are those which incorporate magnesium in one form or another. Magnesium may be present in any suitable form, such as in a dialkyl magnesium compound, a complex of dialkyl magnesium with trialkyl aluminum or an organomagnesium silylamide compound.

The transition metal may be any transition metal which is suitable for use in olefin polymerization, such as titanium, vanadium, zirconium or chromium, for example. Titanium is preferred, especially in combination with a magnesium compound.

In one highly preferred embodiment, the catalyst comprises a magnesium-titanium containing catalyst, and the tetraalkyl-μ-oxodialuminum compound is used as the sole cocatalyst.

The Cocatalyst

The cocatalyst of the invention comprises at least one tetraalkyl-μ-oxodialuminum compound of the formula:

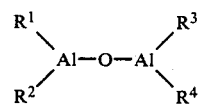

wherein each group $R^1$–$R^4$ is an alkyl group of between 1 and about 12 carbon atoms. The alkyl groups may be the same or different.

It is preferred that the alkyl groups be the same, as such compounds are most readily available. Tetraisobutyl dialuminum oxide (TIBAO) is generally preferred because of its ready commercial availability, but other compounds may be preferred for particular purposes.

Although any alkyl group of up to about 12 carbon atoms, whether straight or branched, is useful, the following are examples of especially suitable alkyl groups: ethyl, n-propyl, iso-propyl, n-butyl, iso-butyl, 4-methylpentyl, n-hexyl and dodecyl.

If a mixture of tetraalkyl-μ-oxodialuminum compounds is used, an exchange of alkyl groups between molecules will generally occur rapidly. By this exchange, structures in which one, two or all four of the alkyl groups are different may form.

It is not believed that either carbon chain length or branching of the alkyl groups is critical. However, for economy and because of availability, ethyl and butyl groups are preferred.

If desired, the tetraalkyl-μ-oxodialuminum cocatalyst may be used in combination with another suitable olefin polymerization cocatalyst, such as a trialkyl aluminum compound, for example.

As is well known, the concentration of the cocatalyst and the ratio of the cocatalyst to catalyst in the polymerization system can affect the reactivity thereof. With any particular system, the optimum ratio and concentration of the tetraalkyl dialuminum oxides can be determined empirically, as by laboratory trials. Most often it is necessary that the concentration of cocatalyst in the system be at least $1 \times 10^{-4}$ mole/liter, with the aluminum to transition metal atomic ratio in the range of about 2 to about 300. A ratio of about 10 to 200 is preferred.

The lowest cocatalyst concentration that is effective is generally preferred, but this value depends on the purity of the ethylene, the comonomer, and solvents, if any. The higher the purity of these constituents, the lower will be the minimum effective cocatalyst concentration. It has been found that a concentration of at least about $3 \times 10^{-4}$ mole/liter is a preferred concentration for successful day-to-day operation.

Reaction Conditions

Polymerization of ethylene and copolymerization of ethylene with other 1-olefins according to the invention can be carried out in the absence of a solvent, preferably at process pressures of between about 15,000 and 40,000 psi and preferably at temperatures of about 190° C. to about 300° C. Alternatively, polymerization or copolymerization can be carried out in the presence of a solvent in a solution form process with pressures of between about 500 and 3,000 psi and at temperatures from about 160° C. to about 250° C.

The upper limit of process temperature is dictated only the decomposition temperature of the catalyst system components and products, and by considerations of phase behavior characteristics.

As is known in the art, any of various saturated hydrocarbons such as ethane, propane or isobutane can be added when operating without a solvent, and hydrogen may be present in order to affect product polymer physical characteristics.

Normally, the catalyst and cocatalyst are added separately to the reaction vessel containing the monomer. However, it is also possible to combine the catalyst and cocatalyst components before contact with monomer.

As stated above, the polymerization method of the invention can be used to polymerize ethylene, or to copolymerize ethylene with other 1-olefins. Olefins having between 3 and 8 carbon atoms are preferred in copolymerization, and propylene and butene are especially preferred. For example, ethylene/butene copolymers having a specific gravity of about 0.920 and conventionally referred to in the art as linear low density polyethylene (LLDPE) may be made according to the invention. In such a copolymerization, the molar ratio of butene to ethylene generally ranges from about 1/1 to 2/1.

Numerous advantages are derived from the inventive method. Firstly, the catalyst system exhibits excellent thermal stability, thus resulting in relatively high yields at higher temperatures than obtainable according to the prior art. As a result, relatively high reactivities in the upper temperature range of 200°–300° C. are obtained.

According to the invention, linear polyethylene (e.g., LLDPE) may be readily produced in plants designed to make conventional branched low density polyethylene.

The melt indexes of product polymers manufactured at high temperatures according to the invention are relatively low, while molecular weights are relatively high (as compared to products made at high temperature according to prior methods). Thus, relatively strong resins are obtained in a high pressure, high temperature process. This is especially important with respect to the manufacture of LLDPE.

Since the catalyst system requires no metallic halide cocatalyst, the amount of chloride or other halides in the system and in the products is greatly reduced, thus decreasing corrosion. One advantage of the decreased chloride content of the system is the elimination of the need for an additive for neutralization of such chlorides.

Since the tetraalkyl dialuminum-$\mu$-oxide compounds of the invention have less reducing power than conventionally used trialkyl aluminum compounds, the transition metal catalytic species have relatively long active lives, even after prolonged use at high temperatures.

It is well known that trialkyl aluminum compounds react with ethylene to form lengthened olefin chains. In a polymerization process for the production of HDPE or LLDPE, the formation of lengthened olefin chains with an uncontrolled distribution of carbon chain length is undesirable. The occurrence of copolymerization in a HDPE process reduces product density, thus frustrating the objective. In an LLDPE process, trialkyl aluminum compounds may cause an irregular branching structure in the polymer molecules, which alters physical properties of the product.

The cocatalysts of the invention, however, do not react directly with ethylene as quickly as do trialkyl aluminum compounds. Thus, it is easier to produce true linear polyethylene or LLDPE products with uniform sized branches.

Furthermore, the tetraalkyl dialuminum oxide compounds of the invention are more economic than many previously used cocatalysts, such as compounds having the formula $R_3SiOAlR_2$.

EXAMPLES

The invention will be illustrated by means of the following detailed Examples. The Examples are illustrative only, and no unnecessary limitations should be inferred therefrom.

EXAMPLE 1

A catalyst was prepared as disclosed in U.S. Pat. No. 4,374,753. Silane-treated, finely divided silica was used for this preparation. This type of silica is made from $SiCl_4$ at high temperature (pyrogenic silica). A 2.6958 g quantity of this silica was added to a dry flask and heated at 110° C. under a gentle $N_2$ flow for 2 hours. During this purging, the silane-treated silica was continuously agitated with a magnetic mixer.

A 100 mL volume of Exxon Corp. Isopar® H solvent was then added followed by 24.4 mL of a solution of dibutyl magnesium complex in heptane. The complex was of the formula $(Bu_2Mg)_{7.1}Et_3Al$ and is sold under the trademark Magala 7.1E by Texas Alkyls. Isopar® H is an isoparaffin solvent with a boiling range of 176°191° C.

1.1 mL of n-butyl alcohol was then added to the reaction mixture. The combination was then stirred for 30 minutes at room temperature. Throughout the preparation the $N_2$ atmosphere was maintained. 1.34 mL of neat titanium tetrachloride was then added. In this preparation the ratio of dibutyl magnesium to silica was 4.5 millimole per gram, and the Mg/Ti/n-butyl alcohol ratio was 1/1/1.

This catalyst preparation was tested in high temperature polymerization at 200° C. at 500 psi with TIBAO cocatalyst with isoprenyl aluminum (70 wt. % in heptane, Schering AG) as the comparison cocatalyst. The polymerization tests were conducted in 500 mL of Isopar® H as a solvent for 10 minutes.

The results of these tests shows that, with this type of catalyst, the cocatalyst of the invention provides higher reactivity than does isoprenyl aluminum.

| Cocatalyst | Al/Ti | Reactivity (g/g Ti)/min |
|---|---|---|
| TIBAO | 146 | 465 |

| Cocatalyst | Al/Ti | Reactivity (g/g Ti)/min |
|---|---|---|
| Isoprenyl Aluminum | 63 | 136 |

EXAMPLE 2

A catalyst slurry was prepared as disclosed in Pullukat et al U.S. patent application Ser. No. 433,369 filed Oct. 7, 1982. The preparation was performed in an $N_2$ purged container equipped with a magnet bar stirrer. This container was immersed in a oil bath with the temperature adjusted to a constant 65° C. Under constant stirring with the magnet bar, a volume of n-butyl magnesium bis(trimethylsilyl)amide (BMSA) solution in heptane was added to a solution of ethylaluminum dichloride (EADC)in Isopar ® H. The molar ratio of the BMSA to EADC was 5/20.

The reaction product slurry was kept stirring in the bath for 60 minutes, then a volume of 0.25 molar solution of titanium tetrachloride in Isopar ® H was added dropwise by syringe. In the final slurry the molar ratio EADC/BMSA/TiCl$_4$ was 20/5/1, and the concentration of the titanium compound was 29.9 millimoles per liter.

This catalyst slurry was tested for ethylene-butene copolymerization with tetraisobutyl dialuminum oxide (TIBAO) cocatalyst and for comparison with diethyl aluminum chloride (DEAC) cocatalyst.

The test temperature was 220° C., Isopar ® H was used as a solvent, and the total pressure was 500 psi. 1-butene was added to the Isopar ® H in the amount of 15 weight percent. The Isopar ® H solvent, 1-butene, the cocatalyst, and the ethylene were combined in the polymerization vessel and the pressure and temperature adjusted as stated above. The catalyst slurry was then injected and the polymerization reaction was continued at constant pressure for 60 seconds. Results of these tests are as follows:

| Cocatalyst | Catalyst Wt. (mg) | Cocatalyst Al/Ti Ratio | Reactivity (g/g Ti)/min |
|---|---|---|---|
| DEAC | 14.2 | 152 | 6600 |
| DEAC | 14.2 | 152 | 5320 |
| DEAC | 14.2 | 152 | 5910 |
| TIBAO | 14.2 | 152 | 13,800 |
| TIBAO | 14.2 | 152 | 12,800 |
| TIBAO | 14.2 | 152 | 13,500 |

This Example shows that the cocatalyst of the invention provides more efficient polymerization than the DEAC cocatalyst, which is conventionally used under the test conditions.

The melt index values for the copolymer samples, and the content of methyl groups for each, as determined by infrared spectroscopy, were as follows:

| Cocatalyst | Melt Index | Methyl Groups per 1000 Carbon Atoms |
|---|---|---|
| DEAC | 1.9 | 36.7 |
| DEAC | 2.4 | 34.7 |
| DEAC | 3.1 | 33.4 |
| TIBAO | 3.5 | 34.1 |
| TIBAO | 3.8 | 38.1 |
| TIBAO | 3.0 | 36.5 |

The foregoing data show that TIBAO imparts greater reactivity than DEAC, but that the melt index of the polymer products remains desirably low. The concentration of methyl groups in the copolymer samples depends upon how much 1-butene is incorporated. The incorporation of 1-butene is about the same whether DEAC or TIBAO is the cocatalyst. The degree of incorporation in these samples correlates with a copolymer density of less than 0.920 g/cm$^3$. It is thus further shown by this Example that the TIBAO cocatalyst is suitable for the high temperature synthesis of so-called linear low density polyethylene.

EXAMPLE 3

A catalyst was prepared in the same way as described in Example 2. It was tested for ethylene homopolymerization at 500 psi in Isopar ® H solvent as in Example 2. The polymerization time was also one minute but runs were made at 200° C., 225° C. and 250° C. These runs gave the following results:

| Temp. °C. | Reactivity (g/g Ti)/min | Melt Index | Methyl Groups per 1000 Carbon Atoms |
|---|---|---|---|
| 200 | 37,000 | 0.07 | 2.3 |
| 225 | 22,000 | 0.42 | 1.3 |
| 250 | 12,950 | 1.25 | 1.2 |

TIBAO was used as the cocatalyst in the ratio of TIBAO/Ti of 76. The low number of methyl groups indicates that linear molecules of polyethylene was produced. This example, therefore, shows that the cocatalyst/catalyst systems of the invention are suitable for high temperature synthesis of high density polyethylene.

Longer 1-olefins, if present in the reaction medium, would tend to copolymerize with the ethylene. This would result in high concentrations of methyl groups in the polymer. However, since the number of methyl groups is low, this Example further shows that the TIBAO cocatalyst of this invention does not cause oligomerization of ethylene at a significant rate.

EXAMPLE 4

A catalyst slurry was prepared in the following manner. A solution of dibutyl magnesium-triethyl aluminum complex (Mg/Al=7) was combined with a slurry of silica in heptane so as to produce a solid reaction product. The silica was Davison Chemical grade 952 silica and was treated with hexamethyl disilazane prior to the start of the catalyst preparation. (This treatment converts surface hydroxyl groups into trimethyl silyl groups.)

A quantity of n-butyl alcohol was added to the slurry of reacted silica in an amount so that the molar ratio of alcohol to dibutyl magnesium was one to one. Following the addition of the dibutyl magnesium, time was allowed for complete reaction. Titanium tetrachloride was then added in an amount so that its molar ratio to dibutyl magnesium was also one to one. Following the completion of this reaction the solvent was evaporated under nitrogen to provide a dry solid powder. A quantity of this powder was combined with Isopar ® H to make a slurry containing 41 weight percent catalyst. This slurry was then milled in a rotary ball-mill for 22 hours.

In this preparation the amount of titanium tetrachloride was 1.25 mmoles per gram of hexamethyl disilazane-treated silica.

Samples of the ball-milled slurry were tested in the homopolymerization of ethylene at 220° C. as described in Example 3 except that 10 psi of hydrogen was added. The test results listed below show that the cocatalyst compounds of this invention can be used to regulate the melt index of high density polyethylene made at high temperature.

| Cocatalyst | Reactivity (g/g Ti)/min | Melt Index |
|---|---|---|
| DEAC | 9000 | 10 |
| 25 mole % DEAC 75 mole % TIBAO | 4800 | 4.4 |

EXAMPLE 5

A catalyst slurry was made in a $N_2$-purged container as described in Example 1. In this case an ethyl aluminum dichloride solution (25 wt. % in Isopar® H) was added to a 10 wt. % solution of butyl ethyl magnesium in heptane. To the reaction product a 0.25 molar solution of $TiCl_4$ in Isopar® H was added. The ratios of the ingredients were BEM/EADC/$TiCl_4$=5/20/1 and the concentration of the titanium species in the final catalyst slurry was 28.9 millimoles per liter.

This catalyst was tested in ethylene-butene copolymerization as described in Example 2 with DEAC and with TIBAO cocatalysts, respectively.

| Cocatalyst | Reactivity (g/g Ti)/min | Melt Index | Methyl Groups per 1000 Carbon Atoms |
|---|---|---|---|
| TIBAO | 23,000 | 6.1 | 40.2 |
| DEAC | 8,400 | 7.9 | 37.8 |

This Example shows that the cocatalyst of the invention gives higher reactivity with this type of catalyst than does the prior DEAC cocatalyst.

EXAMPLE 6

A 15 g-millimole quantity of dihexyl magnesium in the form of a 22.9 wt. % solution in heptane was combined at room temperature with 1.5 millimoles of titanium tetraisopropoxide in a 0.25 M solution in Isopar® H. Hydrogen chloride gas was passed over the reaction mixture which was contained in a round bottom flask. The hydrogen chloride was at about atmospheric pressure, and the treatment was continued for 15 minutes during which time the reactive mixture was continuously stirred. After 15 minutes, the unreacted HCl was swept out with a $N_2$ purge. The final catalyst slurry was dark yellow-brown.

This catalyst slurry was tested for ethylene-butene copolymerization as described in Example 2. In one test DEAC was the cocatalyst and in the other test TIBAO was the cocatalyst.

| | Reactivity (g/g Ti)/min | MI |
|---|---|---|
| TIBAO (Invention) | 2600 | 1.9 |
| DEAC (comparison) | 8800 | 25.3 |

In this Example the inventive catalyst system has less reactivity than a catalyst system with DEAC cocatalyst. However, the inventive system provided a copolymer product of much lower melt index. The ability to lower the melt index in high temperature copolymerization can be important in commercial manufacture of LLDPE products.

All parts and percentages herein are by weight unless indicated otherwise.

The foregoing detailed description is given for clearness of understanding only, and no unnecessary limitations should be inferred therefrom, as modifications within the scope of the invention will be obvious to those skilled in the art.

GLOSSARY OF TERMS

Abbreviations used herein to identify chemical ingredients and product characteristics include:
BMSA—n-butylmagnesium bis(trimethylsilyl)amide
DEAC—diethylaluminum chloride
EADC—ethylaluminum dichloride
HDPE—high density polyethylene
LDPE—low density polyethylene
LLDPE—linear low density polyethylene
MI—melt index
TIBAL—triisobutyl aluminum
TIBAO—tetraisobutyl dialuminum oxide

We claim:

1. A method of polymerizing ethylene or copolymerizing ethylene with one or more 1-olefins, said method comprising the step of polymerizing or copolymerizing said ethylene or said ethylene and 1-olefins under polymerizing conditions at a temperature greater than about 160° C. in the presence of a catalyst system comprising:
    (a) a catalyst containing a catalytically active transisition metal compound and a compound or complex of magnesium selected from the group consisting of dialkyl magnesium compounds, complexes of dialkyl magnesium and trialkyl aluminum, and organomagnesium silylamide compounds; and,
    (b) a cocatalyst comprising at least one compound of the formula $$\begin{array}{c} R^1 \\ \phantom{R^1}\diagdown \\ \phantom{R^1}\phantom{\diagdown}Al-O-Al \\ \diagup \phantom{Al-O-Al}\diagdown \\ R^2 \phantom{Al-O-Al}R^4 \end{array} \quad \begin{array}{c} R^3 \\ \diagup \\ \\ \\ \end{array}$$

wherein $R^1$–$R^4$ are the same or different alkyl groups, each having between about 1 and 12 carbon atoms and the atomic ratio of aluminum in said cocatalyst to said transition metal is between about 10 and about 300.

2. The method of claim 1 wherein said alkyl groups $R^1$–$R^4$ are the same.

3. The method of claim 2 wherein each said alkyl group $R^1$–$R^4$ is isobutyl.

4. The method of claim 1 wherein said alkyl groups $R^1$–$R^4$ are selected from the group consisting of ethyl, n-propyl, iso-propyl, n-butyl, iso-butyl, 4-methyl-pentyl, n-hexyl and dodecyl.

5. The catalyst of claim 1 wherein said transition metal is titanium and said cocatalyst of (b) is the sole cocatalyst.

6. The method of claim 5 wherein said catalyst comprises titanium and a dialkylmagnesium compound.

7. The method of claim 1 wherein said polymerization or copolymerization is carried out at a pressure of between 15,000 and about 40,000 psi and a temperature of between about 190° C. and about 300° C. without a solvent.

8. The method of claim 1 wherein said polymerization or copolymerization is carried out in the presence of a solvent at a pressure of between about 500 and about 3000 psi and a temperature of between about 170° C. and about 250of between about 500 and about 3000 psi and a temperature of between about 170° C. and about 250° C.

9. The method of claim 1 wherein the concentration of said cocatalyst is at least about $1 \times 10^{-4}$ mole/liter.

10. The method of claim 1 wherein said reaction is carried out in a vessel and said ethylene or said ethylene and 1-olefin is introduced to said vessel prior to introduction of said catalyst system.

11. The method of claim 10 wherein said catalyst and said cocatalyst are combined with each other prior to introduction to said vessel.

12. The method of claim 10 wherein said catalyst and said cocatalyst are introduced to said vessel separately.

* * * * *

UNITED STATES PATENT AND TRADEMARK OFFICE
CERTIFICATE OF CORRECTION

PATENT NO. : 4,490,514
DATED : December 25, 1984
INVENTOR(S) : Raymond E. Hoff, et al.

It is certified that error appears in the above-identified patent and that said Letters Patent is hereby corrected as shown below:

Claim 8, column 11, lines 7-9 delete "250of between about 500 and about 3000 psi and a temperature of between about 170° C. and about".

Signed and Sealed this

Seventeenth Day of December 1985

[SEAL]

Attest:

DONALD J. QUIGG

*Attesting Officer*  *Commissioner of Patents and Trademarks*